US009181626B2

(12) United States Patent
Tang et al.

(10) Patent No.: US 9,181,626 B2
(45) Date of Patent: Nov. 10, 2015

(54) COIL SCHEDULING METHOD AND SYSTEM FOR ELECTROGALVANIZING LINE IN STEEL INDUSTRY

(75) Inventors: Lixin Tang, Shenyang (CN); Yang Yang, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 381 days.

(21) Appl. No.: 13/993,622

(22) PCT Filed: Apr. 27, 2012

(86) PCT No.: PCT/CN2012/074839
§ 371 (c)(1),
(2), (4) Date: Jun. 12, 2013

(87) PCT Pub. No.: WO2013/107129
PCT Pub. Date: Jul. 25, 2013

(65) Prior Publication Data
US 2014/0195034 A1 Jul. 10, 2014

(30) Foreign Application Priority Data
Jan. 19, 2012 (CN) .......................... 2012 1 0018536

(51) Int. Cl.
C25D 5/04 (2006.01)
G05B 19/418 (2006.01)
C25D 3/22 (2006.01)
C25D 7/06 (2006.01)

(52) U.S. Cl.
CPC .. *C25D 5/04* (2013.01); *C25D 3/22* (2013.01); *C25D 7/0614* (2013.01); *G05B 19/418* (2013.01); *G05B 19/41865* (2013.01)

(58) Field of Classification Search
CPC .......... C25D 3/22; C25D 5/04; C25D 7/0614; G05B 19/418; G05B 19/41865
USPC ....................................................... 700/147
See application file for complete search history.

(56) References Cited

U.S. PATENT DOCUMENTS 6,177,140 B1 * 1/2001 Patil et al. ............... C23C 2/003
427/321
2011/0258087 A1 * 10/2011 Ghosh et al. ..... G05B 19/41865
705/29

FOREIGN PATENT DOCUMENTS

| CN | 101097617 A | 1/2008 |
| CN | 101322982 A | 12/2008 |
| EP | 1 357 484 A1 | 10/2003 |
| JP | 2005284328 A | 10/2005 |

* cited by examiner

Primary Examiner — Kenneth M Lo
Assistant Examiner — Michael J Huntley
(74) Attorney, Agent, or Firm — Muncy, Geissler, Olds & Lowe, P.C.

(57) ABSTRACT

A coil scheduling system and a method for electrogalvanizing line in steel industry are disclosed. In addition to considering the minimum changeover of physical parameters such as post-processing mode, width, thickness between every two adjacent steel coils, the method of the present invention further considers the influence of selecting coils on the production system stability due to the changeover of post-processing mode, width and thickness, and, thereby less adjusting the production equipment. Thus, the coils are smoothly produced, and more reasonable production process is obtained. The result of comparing the coil production schedule controlled by coil scheduling system for electrogalvanizing line in steel industry of the present invention with that of the production schedule determined manually shows that the number of changeover is reduced by 31.51%, and the adjustment of the production equipment is effectively reduced. Thus, the product quality is improved, and the enterprise benefit is increased.

4 Claims, 9 Drawing Sheets

COIL SCHEDULING METHOD AND SYSTEM FOR ELECTROGALVANIZING LINE IN STEEL INDUSTRY

BACKGROUND OF THE INVENTION

1. Field of the Invention

The present invention relates to the technical field of metal material processing information, which relates to automation technology, and in particular to a coil scheduling method and system for electrogalvanizing line in steel industry.

2. The Prior Arts

The coil scheduling for electrogalvanizing line is considered as a main production and management content of metallurgical enterprises, and the quality of coil scheduling directly affects the stability and operating efficiency of electrogalvanizing line, the product quality and production costs.

Take a steel plant as an example: annealed coils are mainly used as the raw material of electrogalvanizing strip steel, the annealed coils are uniformly painted with a layer of metallic zinc to achieve the aim of rust prevention, beautiful appearance and the other surface characteristics, and the electrogalvanizing line is the process to achieve the above processing objective by zinc painting, post-processing. The main electrogalvanizing process (as shown in FIG. 1) includes: uncoiling the coils, welding the coils into a continuous strip steel, sending the strip steel to the electrogalvanizing unit after cleaning and treating the surface of the strip steel, forming a uniform compact and well-combined metallic zinc deposit layer on the surface of the strip steel; thereafter, post-processing the strip steel to improve the plating or corrosion resistance by passivation, parkerising, fingerprint resistant processing; finally, cutting and coiling up the post-processed strip steel into coils after cleaning, oiling and trimming.

Because of the requirement of the electrogalvanizing process, there are some restrictions for the coil production schedule during the production operation of the electrogalvanizing line, which directly affects the stable operation of equipment, the productivity of the electrogalvanizing line and the product quality. The coil production schedule of the electrogalvanizing line is to make the coils smoothly transitioned as far as possible while satisfying the process constraints of specification, zinc layer thickness, post-processing requirement, so as to increase the operation speed of the electrogalvanizing line, guarantee the product quality, and develop the productivity of the electrogalvanizing line. In the electrogalvanizing process, the coils are welded into a continuous strip. The more changeover of thickness and width between two adjacent coils is, the more the possibility of causing the strip to break and the rollers to wear is, moreover, the production stability and the operating efficiency of the electrogalvanizing line will decrease. If the required post-processing modes of two adjacent coils are different, the post-processing liquid in the electrogalvanizing line needs to be replaced. Thus, in order to process the latter coil in accordance with the corresponding post-processing mode, after processing the former coil, it is necessary to adjust the pulling speed of the equipment strip and even stop the operation. At this moment, the latter coil is paused in the electrogalvanizing line, and the quality of the coil is reduced in the process of equipment adjustment.

At present, in the practical electrogalvanizing production, the coil scheduling of electrogalvanizing line is manually accomplished. Because the electrogalvanizing process has the complicated constraints, and large number of coils to be considered in actual production, it is difficult for manual scheduling to select coils, make coil processing schedule in reasonable time, with the objective of guaranteeing the smooth transition of the width and thickness of adjacent coils, guaranteeing product quality, increasing productivity and guaranteeing the stable operation of the electrogalvanizing line.

SUMMARY OF THE INVENTION

In view of the defects in the existing method, the present invention provides a coil scheduling method and system for electrogalvanizing line in steel industry, to achieve the aims of guaranteeing the smooth transition of the width and thickness of adjacent coils, guaranteeing product quality, increasing productivity, and guaranteeing the stable operation of electrogalvanizing line.

The aim of the present invention is achieved by the following technical scheme. A coil scheduling method for electrogalvanizing line in steel industry comprises the following steps:

Step 1: Describing a technological process and determining constraints of the technological process, and describing in accordance with the following model:

Step 1-1: The objective function of the coil production model of the electrogalvanizing line is:

$$\text{Minimize } \lambda_1 \times \sum_{i=1}^{n} \sum_{j=1}^{n} (c_{ij}^P + c_{ij}^W + c_{ij}^T) x_{ij} + \lambda_2 \times \sum_{i=1}^{n} p_i y_i \quad (1)$$

In the formula, $\lambda_1$ represents the weight of the effect of the production switching (i.e. postprocessing (each postprocessing mode corresponds to a distinct postprocessing code and a distinct postprocessing liquid), width and thickness) on the stability of the production system; $\lambda_2$ represents the weight of the effect of selection of the coils on the stability of the production system; $c_{ij}^P$ represents system stability defect penalty caused by changing the postprocessing liquid if coil j is processed immediately after coil i; $c_{ij}^W$ represents system stability defect penalty caused by width changeover if coil j is processed immediately after coil i; $c_{ij}^T$ represents system stability defect penalty caused by thickness changeover if coil j is processed immediately after coil i; $p_i$ represents system stability influence penalty of processing the selected coil i by the current coil selection schedule; decision variable $x_{ij}$ represents the adjacent relation between the coil i and the coil j in the continuous electrogalvanizing processing schedule; when the coil i is processed immediately before the coil j, $x_{ij}$ is 1; otherwise, $x_{ij}$ is 0; decision variable $y_i$ represents whether the coil i is selected to be processed in the continuous electrogalvanizing processing schedule; when the coil i is selected to be processed, $y_i$ is 1; otherwise, $y_i$ is 0; the number of available coils to be processed is n;

The constraints of the coil production model of electrogalvanizing line comprise constraints to keep feasibility and operation constraints in electro-galvanizing line:

1) The formula of the constraints to keep feasibility is:

$$\sum_{j \in N\{i\}} x_{ij} = y_i \ \forall \ i \in N \quad (2)$$

$$\sum_{i \in N\{j\}} x_{ij} = y_j \ \forall \ j \in N \quad (3)$$

-continued $$\sum_{i,j \in S} x_{ij} \leq |S| - 1 \ \forall S \subseteq \{1, 2, \ldots, n-1, n\}, \quad (4)$$

$$2 \leq |S| \leq n$$

$$x_{ij}, y_i \in \{0, 1\} \ \forall i = 1, 2, \ldots, n-1, n, \quad (5)$$
$$j = 1, 2, \ldots, n-1, n$$

Where, N indicates a set of available coils in the preceding inventory. Constraints (2) and (3) provide a relationship between decision variables $x_{ij}$ and $y_i$; constraints (4) are used for preventing the coils from being preempted in the working process; constraints (5) are the range of decision variables $x_{ij}$ and $y_i$;

In addition to having the above system constraints to keep feasibility (2)-(5), the electrogalvanizing line has operation constraints in electro-galvanizing line during processing the coils:

2) The formula of the constraints for ensuring that the formulated coil processing schedule satisfies the upper limit and the lower limit of the total weight of the processed coils is as follows:

$$L \leq \sum_{i \in N} wt_i y_i \leq U \ \forall i \in N \quad (6)$$

Where, L indicates the lower limit of the total weight of the processed coils in a single production plan of the electrogalvanizing line; U indicates the upper limit of the total weight of the processed coils in a single production plan of the electrogalvanizing line; $wt_i$ indicates the weight of the coil i of the electrogalvanizing line;

3) The postprocessing batching constraints comprise constraints for determining the total weight of the coils in the same postprocessing liquid after processing any coil in the coil processing schedule with the same postprocessing requirement: the formula is as follows:

$$W_j = (1 - z_j) \times \left( W_i + \sum_{j \in N} wt_j x_{ij} \right) \quad (7)$$

$$\forall j \in N$$

And constraints for guaranteeing that the total weight of the coils in the same postprocessing liquid satisfies the upper limit and the lower limit of the total weight of the continuous processed coils in the same postprocessing liquid: the formula is as follows:

$$L^P_{p_j^{-1}} z_j \leq W_j \leq U^P_{p_j^{-1}} z_j \quad (8)$$

$$\forall i \in N$$

Where, $L_{p_j^{-1}}^P$ indicates the lower limit of the total weight of the continuous processed coils with the postprocessing code of $p_j^{-1}$; $p_j^{-1}$ indicates the postprocessing code of the coil j; $W_j$ indicates the total weight of the processed coils in the same postprocessing liquid after processing the coil j; $U_{p_j^{-1}}^P$ indicates the upper limit of the total weight of the continuous processed coils with the postprocessing code of $p_j^{-1}$; $z_j$ indicates a decision variable; when the postprocessing code of the coil j and the postprocessing code of the coil processed immediately before the coil j are identical, it is 0; otherwise, it is 1;

4) The formula of the constraints of the width switching trend for ensuring that the coils in the same postprocessing liquid are processed from wide to narrow is as follows:

$$(w_i - w_j) \times x_{ij} \geq 0 \ \forall i \in N, j \in N, p_i^{-1} = p_j^{-1} \quad (9)$$

Where, $w_j$ represents the width of coil j;

5) The formula of the constraints of the width changeover range for ensuring that the changeover of the exit width between two adjacent coils in the electrogalvanizing processing plan does not exceed the allowed range is as follows:

$$L^W \leq (w_i - w_j) \times x_{ij} \leq U^W \ \forall i \in N, j \in N \quad (10)$$

Where, $L^W$ represents the lower limit of width changeover range in the coil processing schedule of electrogalvanizing line; $U^W$ represents the upper limit of width changeover range in the coil processing schedule of electrogalvanizing line;

6) The formula of the constraints of the thickness changeover range for ensuring that the changeover of the exit thickness between two adjacent coils in the electrogalvanizing processing plan does not exceed the allowed range is as follows:

$$L^T \leq (t_i - t_j) \times x_{ij} \leq U^T \ \forall i \in N, j \in N \quad (11)$$

Where, $L^T$ represents the lower limit of thickness changeover range in the coil processing schedule of electrogalvanizing line; $U^T$ represents the upper limit of thickness changeover range in the coil processing schedule of electrogalvanizing line; $t_i$ represents the thickness of coil i; $t_j$ represents the thickness of coil j;

Step 1-2: Initializing the parameters of the production system of the electrogalvanizing line based on the upper limit and the lower limit of the processing capacity of the electrogalvanizing line within the coil processing plan, the upper limit and the lower limit of the processing capacity of a postprocessing liquid, the width changeover range and the thickness changeover range, the coils in preceding inventory, the coils that are estimated to be arrived in electrogalvanizing line in time and are being processed in the preceding production line now, and the current processing state of the electrogalvanizing line: the formula is as follows:

Setting system stability defect penalty $c_{ij}^P$ caused by changing the postprocessing liquid if coil j is processed immediately after coil i, as follows:

$$c_{ij}^P = \begin{cases} \lambda_{p_j^{-1}}^P, & \text{if the postprocessing liquid required by the coil } i \text{ and the coil } j \text{ are different} \\ 0, & \text{otherwise} \end{cases} \quad (12)$$

Where, $\lambda_{p_j^{-1}}$ represents system stability detect penalty incurred by the initialization of the postprocessing liquid corresponding to the postprocessing code $p_j^{-1}$;

Setting the system stability defect penalty $c_{ij}^W$ caused by width changeover if coil j is processed immediately after coil i, the formula is as follows:

$$c_{ij}^w = \begin{cases} \alpha_1^w \cdot (w_i - w_j), & \text{If } 0 \leq w_i - w_j \leq w_1^L \text{ and } t_i < t^L \\ \alpha_2^w \cdot (w_i - w_j), & \text{If } 0 \leq w_i - w_j \leq w_2^L \text{ and } t_i \geq t^L \\ \infty, & \text{If } w_i - w_j < 0 \\ \alpha_3^w \cdot (w_i - w_j), & \text{otherwise} \end{cases} \quad (13)$$

Where, $\alpha_1^w$ represents the penalty of the unit width changeover under the condition that the thickness of the preceding processed coil is less than $t^L$ and the width changeover is not more than $w_1^L$; $\alpha_2^w$ represents the penalty of the unit width changeover under the condition that the thickness of the preceding processed coil is not less than $t^L$ and the width changeover is not more than $w_2^L$; $\alpha_3^w$ represents the penalty of the unit width changeover not satisfying the condition that the thickness of the preceding processed coil is less than $t^L$ and the width changeover is not more than $w_1^L$ or the thickness of the preceding processed coil is not less than $t^L$ and the width changeover is not more than $w_2^L$ when processing from wide to narrow; $t^L$ represents a thickness boundary value during calculating system stability defect penalty caused by thickness changeover; $w_1^L$ and $L_2^L$ represent width boundary values during calculating system stability defect penalty caused by width changeover;

Setting system stability defect penalty $c_{ij}^T$ caused by thickness changeover if coil j is processed immediately after coil i; the formula is as follows:

$$c_{ij}^t = \alpha^t \cdot \frac{\max\{t_i, t_j\}}{\min\{t_i, t_j\}} - \alpha^t \quad (14)$$

Where, $\alpha^t$ represents the unit system stability defect penalty incurred by the thickness changeover;

Setting the system stability influence penalty $p_i$ incurred by processing the selected coil i in the current coil schedule;

Step 2: Selecting the coils according to the current state of the electrogalvanizing line; the selection method comprises the following steps: selecting the coils of the electrogalvanizing line to be processed according to the current line state and the inventory and production conditions of the preceding lines: firstly, judging postprocessing liquid k adopted by the current line; computing the total weight $W_k^P$ of the coils that have been processed by using the postprocessing liquid k; determining the current processing capacity of the postprocessing liquid according to the rated processing range of the postprocessing liquid $[L_k^P, U_k^P]$ set by a system: $Q=U_k^P-W_k^P$;

If $U_k^P-W_k^P \leq U$, the coils are selected as follows:

Step 2.1: Judging the current processing state of the line; finding the width of the last coil in the production schedule before the current formulated production schedule, that is the upper limit of the available processing width $W^A$ of the current roller;

Step 2.2: Determining the total weight of available coils in the current production period according to the preceding inventory of the electrogalvanizing line and the processing condition of the preceding production line; classifying the coils in a required postprocessing mode; computing the total tonnage $W_k$ of the available coils which should be processed by using the postprocessing liquid k and have the width of not greater than $W^A$; judging as follows:

If $W_k \leq Q$, all the coils, which should be processed in the required postprocessing liquid k and have the width of not greater than $W^A$, are selected; recording all related coil numbers;

If $W_k > Q$, selecting from the coils which should be processed in the required postprocessing liquid k and have the width of not greater than $W^A$. The selection method comprises the following steps:

Step 2.2.1: If there is no coil whose width is greater than or equal to $W^A+L^W$ in the coil set, selecting coils from narrow to wide until the newly added coils cause the current total weight of the selected coils to exceed $U_k^P-W_k^P$;

Step 2.2.2: If there are coils whose widths are greater than or equal to $W^A+L^W$ in the coil set, computing the total tonnage W' of the coils whose widths are not less than $W^A+L^W$; if $W' \geq U_k^P-W_k^P$, selecting coils whose width is not less than $W^A+L^W$ from wide to narrow until the total weight of the selected coils exceeds $U_k^P-W_k^P$; otherwise, selecting all the coils whose widths are not less than $W^A+L^W$ and selecting coils whose width is less than $W^A+L^W$ from narrow to wide until the total weight of the current selected coils exceeds $U_k^P-W_k^P$;

Step 2.2.3: If the total weight of the selected coils does not meet the lower bound of the total weight of the selected coils, selecting coils required to be processed in the other postprocessing liquid; selecting coils according to the ascending order of the postprocessing codes, i.e., firstly selecting the coils in the postprocessing mode g=k+1; updating the upper weight limit of the total weight of the selected coils as $U'=U-(U_k^P-W_k^P)$:

(1) If the total weight of available coils required to be processed by using the postprocessing liquid g meets $W_g \geq U'$, selecting coils required to be processed by using the postprocessing liquid g from narrow to wide until the total weight of selected coils exceeds U;

(2) If the total weight of available coils required to be processed by using the postprocessing liquid g meets $W_g < U'$, selecting all the coils required to be processed by using the postprocessing liquid g, updating k=k+1, and going to step 2.2.3;

where, updating k as the smallest postprocessing code if the current postprocessing code k in the step 2.2.3(2) is the largest postprocessing code; the current postprocessing code g of selecting means the postprocessing code that the selected coils correspond to;

If $U_k^P-W_k^P > U$, the selection steps of the coils are as follows:

Step 2-1: Judging the current processing state of the line; finding the width of the last coil in the schedule before the current formulated schedule, that is the upper limit of the available processing width $W^A$ of the current roller;

Step 2-2: Determining the total weight of available coils in the current production period according to the preceding inventory of the electrogalvanizing line and the processing state of a preceding production line; classifying the coils in a required postprocessing mode; computing the total tonnage $W_k$ of the available coils which are required to be processed by using the postprocessing liquid k and have the width of not greater than $W^A$; judging as follows:

If $W_k \leq U$, all the coils, which are required to be processed by using the postprocessing liquid k and have the width of not greater than $W^A$, are selected; recording all related coil numbers;

If $W_k > U$, selecting from the coils which are required to be processed by using the postprocessing liquid k and have the width of not greater than $W^A$:

Step 2-2-1: If there is no coil whose width is greater than or equal to $W^A+L^W$ in a coil set, selecting coils from narrow to wide until the selected coils result in that the total weight of the selected coils exceeds U;

Step 2-2-2: If there are coils whose widths are greater than or equal to $W^A+L^W$ in the coil set, computing the total tonnage W' of the coils whose widths are not less than $W^A+L^W$; if $W' \geq U$, selecting coils whose width is not less than $W^A+L^W$ from wide to narrow until the selected coils result in that the total weight of the selected coils exceeds U; otherwise, selecting all the coils whose widths are not less than $W^A+L^W$ and selecting coils whose width is less than $W^A+L^W$ from narrow to wide until the total weight of the selected coils exceeds U;

Step 2-2-3: If the total weight of the selected coils does not meet the lower bound of the total weight of the selected coils, selecting coils in the other postprocessing mode; selecting coils according to the ascending order of the postprocessing codes, i.e., firstly selecting the coils in the postprocessing mode g=k+1; updating the upper weight limit of the total weight of the selected coils as U'=U−$W_k$:

(1) If the total weight of available coils required to be processed by using the postprocessing liquid g meets $W_g \geq U'$, selecting coils in the postprocessing mode g from narrow to wide until the total weight of the selected coils exceeds U;

(2) If the total weight of available coils required to be processed by using the postprocessing liquid g meets $W_g < U'$, selecting all the coils in the postprocessing mode g, updating k=k+1, and going to step 2-2-3;

Step 3: Setting the initial processing schedule of the selected coils of the electrogalvanizing line; classifying the selected coils, then the coils with same postprocessing code form a cluster; for any coil cluster, scheduling the coils from thick to thin or from thin to thick in order to minimize the total changeover costs of the coil schedule in the cluster; for two adjacent clusters, if the coils in the preceding cluster are scheduled from thin to thick or from thick to thin, the coils in the next cluster are scheduled from thick to thin or from thin to thick; in this way, the thickest or thinnest coil in the next cluster is processed after the thickest or thinnest coil in the preceding cluster; the method is as follows:

Step 3.1: Initializing the current postprocessing code k as the minimum postprocessing code in the selected coils;

Step 3.2: If all the coils in the postprocessing mode are scheduled, obtaining the original processing schedule of the coils and outputting a result; otherwise, going to step 3.3;

Step 3.3: Scheduling the coils required to be processed by using the postprocessing liquid k from wide to narrow; classifying the coils required to be processed by using the postprocessing liquid according to their widths, thus g coil sets $\Omega_{k1}, \Omega_{k2}, \ldots, \Omega_{kg}$ are formed;

Step 3.4: Scheduling the coils in the coil sets $\Omega_{k1}, \Omega_{k2}, \ldots, \Omega_{kg}$, respectively, to form two coil schedules, where the method to obtain the first schedule comprises the steps: scheduling the coils in the coil set $\Omega_{kg}$ with odd labels from thick to thin; scheduling the coils in the coil set $\Omega_{kg}$ with even labels from thin to thick; the method to obtain the second schedule comprises the steps: scheduling the coils in the coil set $\Omega_{kg}$ with odd labels from thin to thick; scheduling the coils in the coil set $\Omega_{kg}$ with even labels from thick to thin; comparing the two schedules; setting the coil schedule with the minimum total stability defects as the initial coil schedule $S^I$ of the selected coils of the electrogalvanizing line;

Step 4: Improving the coil schedule of the electrogalvanizing line in time. The improving method comprises the following steps:

Step 4.1: Initializing the parameters of the improving method of the system stability; setting the current processing schedule $S^B$ of the coils of the electrogalvanizing line as $S^I$; obtaining the current selected coil set CS and the current available coil set CA, where CS is a coil set for all the coils selected in the current processing schedule of the electrogalvanizing line; CA is a coil set of all the coils which are in inventory or can be sent to the electrogalvanizing line in time based on the processing state of the preceding line but not selected in the current coil processing schedule of the electrogalvanizing line; |CS| is the number of the coils in the current selected coil set CS; |CA| is the number of the coils in the current available coil set CA; obtaining the coil processing schedules $m_1, m_2, \ldots, m_{|CS|}$ corresponding to the current coil processing schedule $S^B$ of the electrogalvanizing line, where $m_i$ is a coil which is the $i^{th}$ processed coil in the current coil processing schedule of the electrogalvanizing line; setting a stability estimation value as the formula:

$$f(\overline{S}) = \lambda_1 \times \sum_{i=1}^{n} \sum_{j=1}^{n} (c_{ij}^P + c_{ij}^W + c_{ij}^T)x_{ij}^S + \lambda_2 \times \sum_{i=1}^{n} p_i y_i^S \quad (15)$$

In the formula, the stability estimation value is a system stability penalty of the coil processing schedule S. The smaller the punishment value is, the stabler and more practicable the coil schedule is.

Step 4.2: Computing the stability estimation value $f(S^B)$ of the current coil processing schedule of the electrogalvanizing line;

Step 4.3: Determining the candidate improvement set P of the current coil processing schedule $S^B$ of the electrogalvanizing line; obtaining the improving method of the coil processing schedule, as follows:

(1) Inserting the coils: On the premise of not violating the production capacity constraints and postprocessing batching constraints, obtaining a candidate improved coil processing schedule by inserting new coils h in the current coil processing schedule; the positions of the new coils h in the coil processing schedule shall meet the processing constraints (1) to (11) set by the system;

(2) Deleting the coils: On the premise of not violating the production capacity constraints and postprocessing batching constraints, obtaining a candidate improved coil processing schedule with lower stability estimation value by deleting the coil (i=1, 2, . . . , |CS|) from the current coil processing schedule while ensuring that the width and thickness switching range of coil and coil $m_{i+1}$ does not violate the constraints (10), (11) after deleting the coil $m_i$;

(3) Adjusting coil selection schemes: On the premise of not violating the production capacity constraints, postprocessing batching constraints and the processing constraints (2) to (11) set by the system, obtaining a candidate improved coil processing schedule with lower stability estimation value by exchanging the coils in the coil CS in the current coil processing schedule and the coils in the current available coil set CA;

(4) Adjusting the coil processing schedule: On the premise of not violating the production capacity constraints and postprocessing batching constraints, obtaining a candidate improved coil processing schedule with lower stability estimation value by adjusting the positions of the coils in the current coil processing schedule through the exchange neighborhood and the 2-opt neighborhood of the current coil processing schedule;

Where, the exchange neighborhood of the current coil processing schedule refers to: a set of all the possible coil schedules obtained by exchanging the positions of any two coils in the coil processing schedule of the electrogalvanizing line on the premise of not violating the processing constraints (2) to (11) set by the system;

2-opt neighborhood refers to: a set of all the possible coil schedules obtained by exchanging any two coil adjacent relations in the coil processing schedule of the electrogalvanizing line on the premise of not violating the processing constraints (2) to (11) set by the system;

Step 4.4: Establishing a reference set of improvement schemes of the coil processing schedule; adding the previous b1 candidate improvement schemes with better stability estimation values in the current candidate improvement set P into the reference set, i.e. RefSet=$\{x_1, \ldots, x_{b1}\}$; removing the $b_1$ candidate improvement schemes from the candidate improvement set P; computing the minimum distance between each candidate improvement scheme in the current candidate improvement set P and the current coil scheduling scheme in the reference set; adding the candidate improvement scheme of the coil processing schedule with the largest minimum distance from the reference set into the reference set RefSet; removing it from the candidate improvement set P; repeating the process $b_2$ times; then, the current reference set RefSet=$\{x^1, \ldots, x^b\}$, b=$b_2$+$b_2$;

Step 4.5: Generating b(b-1) new coil improvement schemes based on any pair of coil processing schedules in the reference set RefSet by using the combined method of the coil scheduling schemes; improving the new improvement schemes; obtaining candidate coil scheduling improvement schemes with better stability by using steps 4.3 (1) to (4);

The combined method of the coil scheduling schemes comprises the steps: firstly, contrasting the coil selection of two coil processing schedules; obtaining a set comprised by the coils selected by the two coil scheduling schemes; secondly, determining the processing positions of the coils in the set comprised by the coils selected by the two coil scheduling schemes; if adjacent coils both belong to set comprised by the coils selected by the two coil scheduling schemes, the adjacent relation in the coil processing schedules with better system stability is adopted; if adjacent coils do not belong to the set comprised by the coils selected by the two coil scheduling schemes, trying to insert the coils into primal positions; obtaining the coil processing schedule with better evaluation;

Step 4.6: Updating the candidate improvement set P; replacing solutions with poor stability in the candidate improvement set P by the new candidate coil scheduling improvement schemes with better stability;

Step 4.7: If the time that the best candidate improvement scheme in the candidate improvement set P is not improved reaches the upper limit of non-improvement iterations, stopping selecting the candidate improvement scheme with the best evaluation value in the candidate improvement set P as the current improvement scheme; otherwise, going to the step 4.4.

A coil scheduling system for electrogalvanizing line in steel industry comprises at least one personal computer (PC), at least one cable interface or fiber optic cable interface or special telephone line interface, and at least one router; the PC is internally installed with the system for scheduling the coils of the electrogalvanizing line; the software comprises a production environment setting module, a coil selection module, a coil scheduling module and a coil scheduling real-time improvement module, where the production environment setting module is used for setting the processing parameters of the production environment of the electrogalvanizing line, describing a technological process, and determining the improvement objectives and the constraints of the technological process; the coil selection module is used for selecting the coils and determining the coil selection scheme according to the current processing state of the electrogalvanizing line; the coil scheduling module is used for scheduling the selected coils based on the current coil selection condition, obtaining various processing schedules of the coils and selecting a better coil schedule as the current processing scheme; the coil scheduling real-time improvement module is used for conducting online real-time improvement on the current coil processing scheme, improving the processing scheme and obtaining better coil processing schedules; the PC is connected to the terminal of an enterprise automatic control system of the electrogalvanizing line through a network and an internal server.

Advantages of the present invention: the method of the present invention has the following advantages:

(1) In addition to considering the minimized changeover of physical parameters such as post-processing mode, width, thickness of adjacent coils, the method of the present invention further considers the influence of selecting coils on the changeover of post-processing mode, width and thickness, and production system stability, so that the production equipment is less adjusted, and the coils are smoothly produced, to enable the production process to be more reasonable.

(2) The result of comparing the coil production schedule controlled by coil scheduling system for electrogalvanizing line in steel industry of the present invention with that of the production schedule determined manually shows that the number of changeover is reduced by 31.51%, and the adjustment of the production equipment is effectively reduced. Thus, the product quality is improved, and the enterprise benefit is increased.

(3) Considering that there is similarity between the electrogalvanizing process for other metal material and the electrogalvanizing process of iron and steel enterprises, the optimization method and system provided in the present invention can further be widely applied to the electrogalvanizing process of other metal material in addition to being applied to the electrogalvanizing process of iron and steel enterprises.

(4) The present invention combines the method of automatically optimizing coil production schedule with the manually adjustment interface, and is characterized by the efficiency of the computer and the experience and flexibility of the planners, thereby improving the performance of the method to a largest extent.

(5) The coil scheduling system for electrogalvanizing line in steel industry of the present invention combines modular design idea with the graphical interface, the modular design facilitates modification and transplantation of the system, and the graphical interface facilitates the user to observe operation.

DETAILED DESCRIPTION OF THE PREFERRED EMBODIMENT

The present invention will further be described in detail in accordance with the figures and the preferable examples.

Figure 1:
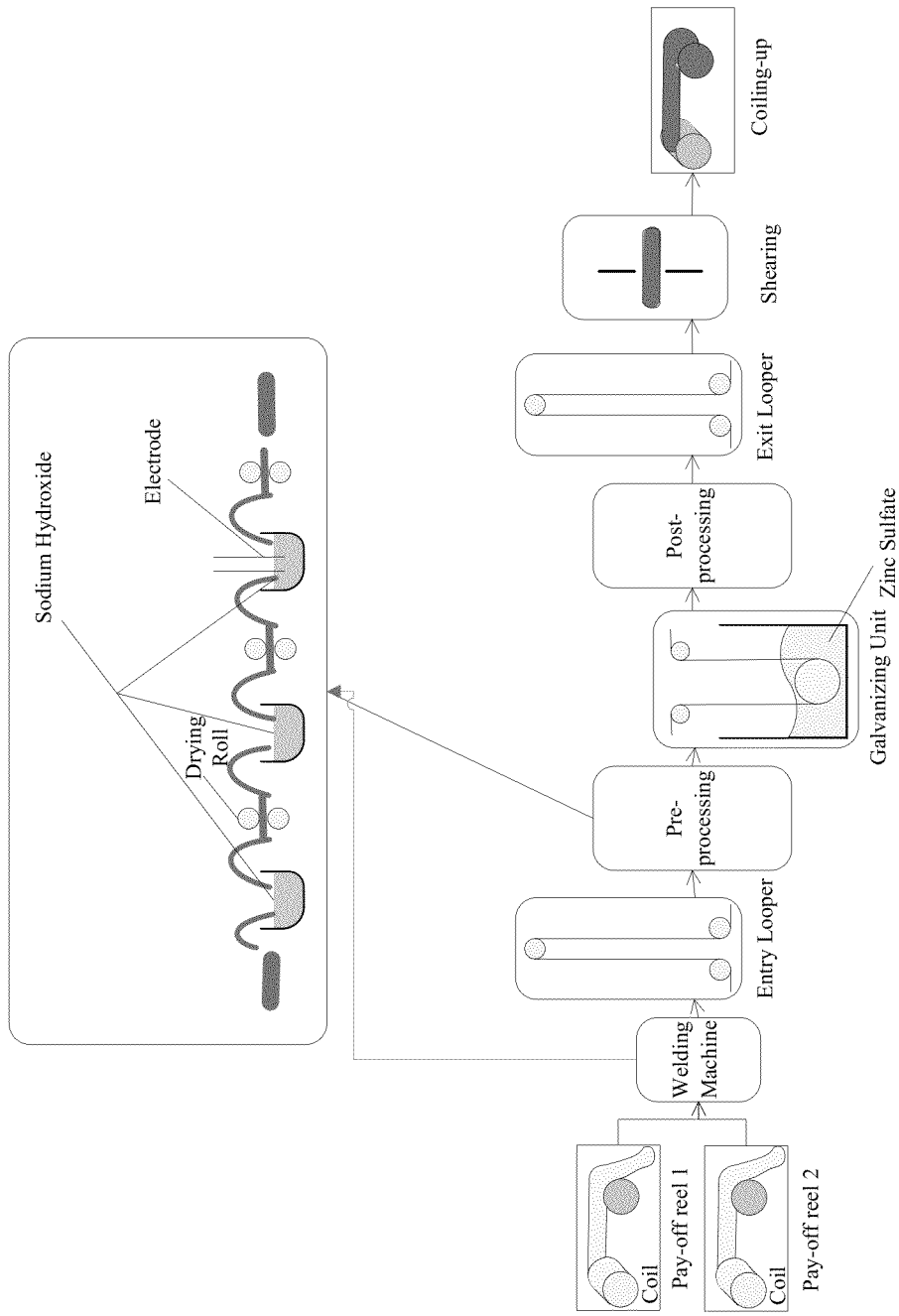
FIG. 1 is the flow diagram of the coil scheduling system for electrogalvanizing line in steel industry.
Figure 2:
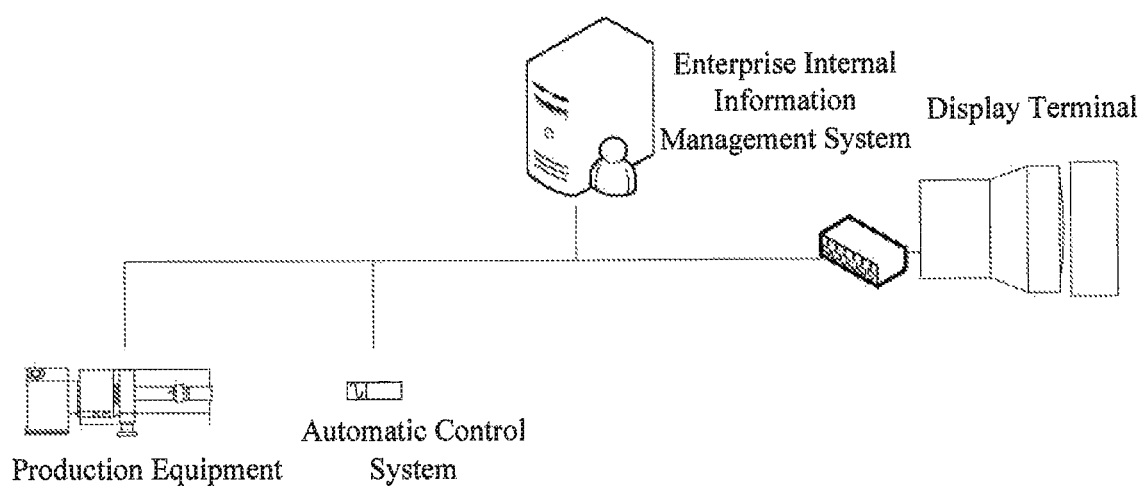
FIG. 2 is the structural block diagram of the coil scheduling system for electrogalvanizing line in steel industry of the present invention.

The process flow of the coil scheduling system for electrogalvanizing line in steel industry in the example is shown in FIG. 1, and the structure of the coil scheduling system for electrogalvanizing line in steel industry in the example is shown in FIG. 2. The coil scheduling system for electrogalvanizing line in steel industry comprises a PC, a cable interface, and a router; where the PC is used for achieving and operating the optimizing system of the present invention, the router and the cable interface as communication equipment are used for connecting to the enterprise internal information management platform, the coil scheduling system and the automatic control system of production site, to achieve the aims of optimizing the production process and improving the quality of products; the PC should support operating systems including Windows operating system as support platform, have Microsoft SQL Server 2000 database that has been installed on it for supporting data management, and be capable of information transmission; loads coil data information (including coil number, order number, entry thickness, entry width, exit width, exit thickness, coil weight, material group, supplement number, plating thickness, post-processing mode, trimming mark, date of delivery, steel grade) from the enterprise ERP data server, sets system parameters (including the upper limit and lower limit of the planed gross weight, the upper limit and lower limit of the total weight of the coils with same post-processing mode, the upper limit of the changeover of width and thickness, penalty incurred by selecting coils, penalty of width or thickness changeover) to obtain operational objectives of the scheduling method and system, and adds and deletes coil information one by one in accordance with the consumption of inventory and the state of the preceding line, modifies the coil information, and determines the modified coil information as the coil information considered in the current production plan; then, enters the module of automatically optimizing coil schedule. In the example, the automatic coil scheduling method will be used for solving the scheduling problem with 12 coils. The detailed information for the coils is shown in the following Table 1:

TABLE 1

| | Coil Information | | | |
|---|---|---|---|---|
| SN | Post-processing Code | Width (mm) | Thickness (mm) | Weight (t) |
| 1 | 6 | 800 | 0.18 | 14.23 |
| 2 | 6 | 800 | 0.18 | 14.3 |
| 3 | 6 | 800 | 0.18 | 16.31 |
| 4 | 6 | 800 | 0.18 | 12.68 |
| 5 | 6 | 800 | 0.18 | 14.26 |
| 6 | 6 | 800 | 0.18 | 17.08 |

TABLE 1-continued

| | Coil Information | | | |
|---|---|---|---|---|
| SN | Post-processing Code | Width (mm) | Thickness (mm) | Weight (t) |
| 7 | 6 | 800 | 0.18 | 13.68 |
| 8 | 6 | 896 | 0.18 | 16.56 |
| 9 | 6 | 896 | 0.18 | 16.1 |
| 10 | 6 | 896 | 0.18 | 17.16 |
| 11 | 6 | 896 | 0.18 | 16.74 |
| 12 | 6 | 896 | 0.18 | 15.97 |

Figure 3:
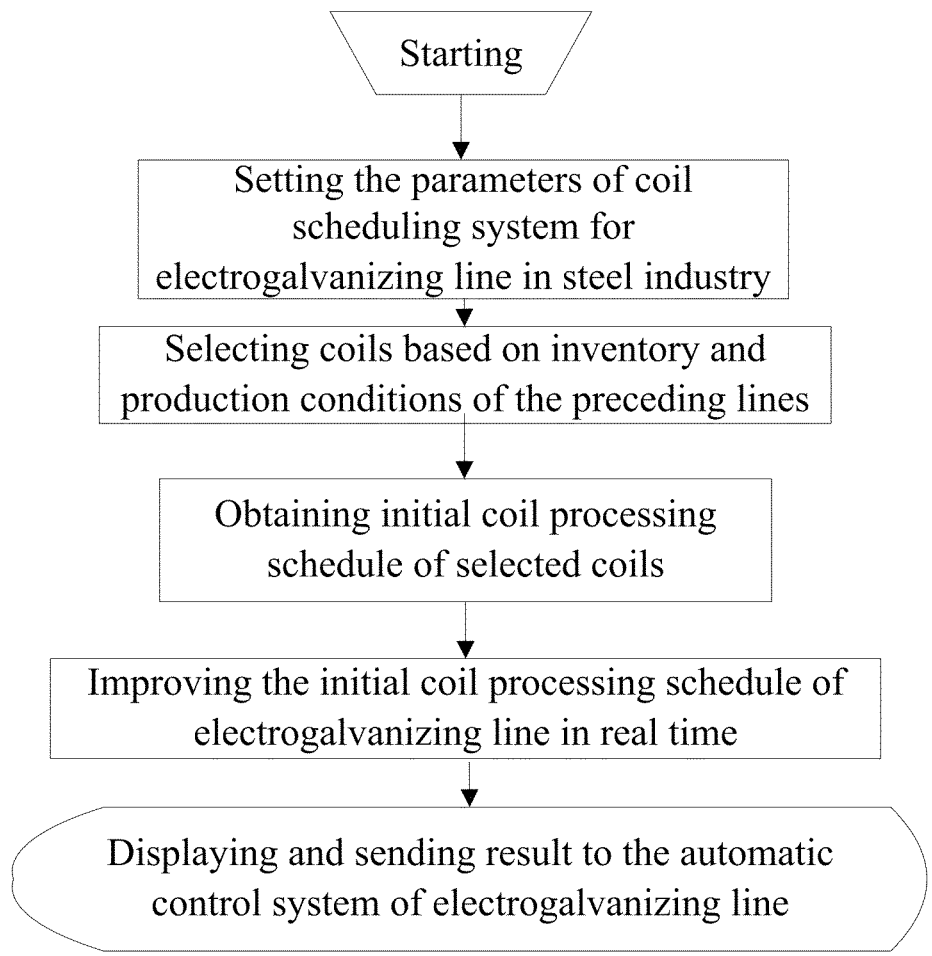
FIG. 3 is the flow diagram of the coil scheduling method for electrogalvanizing line in steel industry of the present invention.
Figure 4:
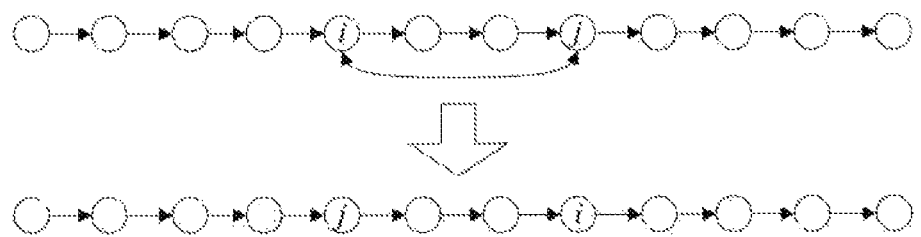
FIG. 4 is the illustration of the first move in the coil scheduling method for electrogalvanizing line in steel industry of the present invention.
Figure 5:
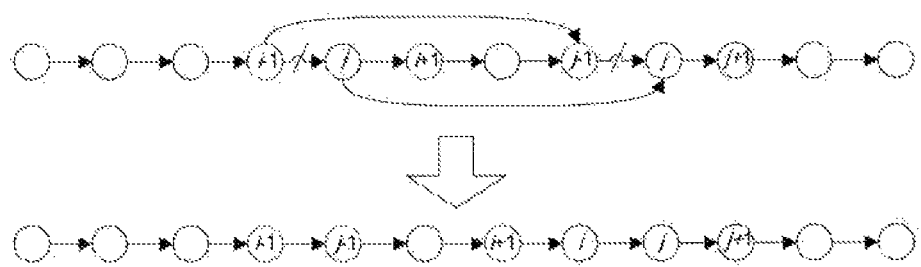
FIG. 5 is the illustration of the second move in the coil scheduling method for electrogalvanizing line in steel industry of the present invention.

A coil scheduling method for electrogalvanizing line in steel industry is used in the example, FIG. 3 shows the flow of the method, and the method comprises the following steps:

Step 1: Setting the parameters for coil processing of electrogalvanizing line by using the coil production model of electrogalvanizing line: setting the processing capacity range of the electrogalvanizing line as [100, 120], the processing capacity range of a post-processing liquid as [110, 200], the range of width and thickness changeover as [0, 150] and [0, 2], respectively, based on the preceding inventory of electrogalvanizing, the coils that can arrive the electrogalvaning line in the planning period, and the current processing state of electrogalvanizing line. Initializing the parameters of coil scheduling system for electrogalvanizing line; separately calculating the system stability defect penalty $c_{ij}^P$ caused by changing the postprocessing liquid if coil j is processed immediately after coil i, the system stability defect penalty $c_{ij}^W$ caused by thickness changeover if coil j is processed immediately after coil i; the system stability defect penalty $c_{ij}^T$ caused by width changeover if coil j is processed immediately after coil i; the system stability influence penalty $p_i$ of processing the selected coil i by the current coil selection schedule.

Step 2: Selecting the coils according to the current state of the electrogalvanizing line;

Selecting the coils of the electrogalvanizing line to be processed according to the current line state and the inventory and production conditions of the preceding lines;

In the example, because of $U_k^P - W_k^P > U$, the coil selection scheme is obtained by performing the following specific steps:

Step 2-1: Judging the current processing state of the line; setting the upper limit $W^A$ of the available width of the current processing roller as the width of the last coil in the preceding plan of the current plan;

Step 2-2: Determining the total weight of available coils in the current production period according to the preceding inventory of the electrogalvanizing line and the processing state of a preceding production line; classifying the coils in a required postprocessing mode; computing the total tonnage $W_k$ of the available coils which are required to be processed by using the postprocessing liquid k and have the width of not greater than $W^A$; judging as follows:

If $W_k \leq U$, all the coils, which are required to be processed by using the postprocessing liquid k and have the width of not greater than $W^A$, are selected; recording all related coil numbers;

If $W_k > U$, selecting from the coils which are required to be processed by using the postprocessing liquid k and have the width of not greater than $W^A$:

Step 2-2-1: If there is no coil whose width is greater than or equal to $W^A + L^W$ in a coil set, selecting coils from narrow to wide until the selected coils result in that the total weight of the selected coils exceeds U;

Step 2-2-2: If there are coils whose widths are greater than or equal to $W^A+L^W$ in the coil set, computing the total tonnage W' of the coils whose widths are not less than $W^A+L^W$; if W'≥U, selecting coils whose width is not less than $W^A+L^W$ from wide to narrow until the selected coils result in that the total weight of the selected coils exceeds U; otherwise, selecting all the coils whose widths are not less than $W^A+L^W$ and selecting coils whose width is less than $W^A+L^W$ from narrow to wide until the total weight of the selected coils exceeds U;

Finally, selecting coils 1-8 into the current plan;

Step 3: Setting the initial processing schedule of the selected coils of the electrogalvanizing line; classifying the selected coils, then the coils with same postprocessing code form a cluster; for any coil cluster, scheduling the coils from thick to thin or from thin to thick in order to minimize the total changeover costs of the coil schedule in the cluster; for two adjacent clusters, if the coils in the preceding cluster are scheduled from thin to thick or from thick to thin, the coils in the next cluster are scheduled from thick to thin or from thin to thick; in this way, the thickest or thinnest coil in the next cluster is processed after the thickest or thinnest coil in the preceding cluster; the method is as follows:

Step 3.1: Initializing the current post-processing code k as the minimum post-processing code in the selected coils;

Step 3.2: If all the coils in the postprocessing mode are scheduled, obtaining the original processing schedule of the coils and outputting a result; otherwise, going to step 3.3.

Step 3.3: Scheduling the coils required to be processed by using the postprocessing liquid k from wide to narrow; classifying the coils required to be processed by using the postprocessing liquid according to their widths, thus g coil sets $\Omega_{k1}, \Omega_{k2}, \ldots, \Omega_{kg}$ are formed;

Step 3.4: Scheduling the coils in the coil sets $\Omega_{k1}, \Omega_{k2}, \ldots, \Omega_{kg}$, respectively, to form two coil schedules, where the method to obtain the first schedule comprises the steps: scheduling the coils in the coil set $\Omega_{kg}$ with odd labels from thick to thin; scheduling the coils in the coil set $\Omega_{kg}$ with even labels from thin to thick; the method to obtain the second schedule comprises the steps: scheduling the coils in the coil set $\Omega_{kg}$ with odd labels from thin to thick; scheduling the coils in the coil set $\Omega_{kg}$ with even labels from thick to thin; comparing the two schedules; setting the coil schedule with the minimum total stability defects as the initial coil schedule $S^I$ of the selected coils of the electrogalvanizing line;

Step 4: Improving the coil schedule of the electrogalvanizing line in time. The improving method comprises the following steps:

Step 4.1: Initializing the parameters of the improving method of the system stability; setting the current processing schedule $S^B$ of the coils of the electrogalvanizing line as $S^I$; obtaining the current selected coil set CS and the current available coil set CA, where CS is a coil set for all the coils selected in the current processing schedule of the electrogalvanizing line; CA is a coil set of all the coils which are in inventory or can be sent to the electrogalvanizing line in time based on the processing state of the preceding line but not selected in the current coil processing schedule of the electrogalvanizing line; |CS| is the number of the coils in the current selected coil set CS; |CA| is the number of the coils in the current available coil set CA; obtaining the coil processing schedules $m_1, m_2, \ldots, m_{|CS|}$ corresponding to the current coil processing schedule $S^B$ of the electrogalvanizing line, where $m_i$ is a coil which is the $i^{th}$ processed coil in the current coil processing schedule of the electrogalvanizing line; calculating the stability estimation value as follow:

$$f(S) = \lambda_1 \times \sum_{i=1}^{n} \sum_{j=1}^{n} (c_{ij}^P + c_{ij}^W + c_{ij}^T) x_{ij} + \lambda_2 \times \sum_{i=1}^{n} p_i y_i \quad (15)$$

Where, the stability estimation value is a system stability penalty of the coil processing schedule S. The smaller the penalty is, the stabler and more practicable the coil schedule is;

Step 4.2: Calculating the stability estimation value $f(S^B)$ of the current coil processing schedule of the electrogalvanizing line;

Step 4.3: Determining the candidate improvement set P of the current coil processing schedule $S^B$ of the electrogalvanizing line, the method of obtaining the coil processing schedule including:

(1) Inserting the coils: On the premise of not violating the production capacity constraints and postprocessing batching constraints, obtaining a candidate improved coil processing schedule by inserting new coils h in the current coil processing schedule; the positions of the new coils h in the coil processing schedule shall meet the processing constraints (1) to (11) set by the system;

(2) Deleting the coils: On the premise of not violating the production capacity constraints and postprocessing batching constraints, obtaining a candidate improved coil processing schedule with lower stability estimation value by deleting the coil (i=1, 2, . . . , |CS|) from the current coil processing schedule while ensuring that the width and thickness switching range of coil $a_{i-1}$ and coil $m_{i+1}$ does not violate the constraints (10), (11) after deleting the coil $m_i$;

(3) Adjusting coil selection schemes: On the premise of not violating the production capacity constraints, postprocessing batching constraints and the processing constraints (2) to (11) set by the system, obtaining a candidate improved coil processing schedule with lower stability estimation value by exchanging the coils in the coil CS in the current coil processing schedule and the coils in the current available coil set CA;

(4) Adjusting the coil processing schedule: On the premise of not violating the production capacity constraints and postprocessing batching constraints, obtaining a candidate improved coil processing schedule with lower stability estimation value by adjusting the positions of the coils in the current coil processing schedule through the exchange neighborhood and the 2-opt neighborhood of the current coil processing schedule;

Step 4.4: Establishing a reference set of improvement schemes of the coil processing schedule; adding the previous $b_1$ candidate improvement schemes with better stability estimation values in the current candidate improvement set P into the reference set, i.e. RefSet=$\{x_1, \ldots, x_{b1}\}$; removing the $b_1$ candidate improvement schemes from the candidate improvement set P; computing the minimum distance between each candidate improvement scheme in the current candidate improvement set P and the current coil scheduling scheme in the reference set; adding the candidate improvement scheme of the coil processing schedule with the largest minimum distance from the reference set into the reference set RefSet; removing it from the candidate improvement set P; repeating the process $b_2$ times; then, the current reference set RefSet=$\{x^1, \ldots, x^b\}$, b=$b_2+b_2$;

Step 4.5: Generating b(b-1) new coil improvement schemes based on any pair of coil processing schedules in the reference set RefSet by using the combined method of the coil scheduling schemes; improving the new improvement schemes; obtaining candidate coil scheduling improvement schemes with better stability by using steps 4.3 (1) to (4);

Step 4.6: Updating the candidate improvement set P; replacing solutions with poor stability in the candidate improvement set P by the new candidate coil scheduling improvement schemes with better stability;

Step 4.7: If the time that the best candidate improvement scheme in the candidate improvement set P is not improved reaches the upper limit of non-improvement iterations, stopping selecting the candidate improvement scheme with the best evaluation value in the candidate improvement set P as the current improvement scheme;

Otherwise, go to step 4.4;

The obtained coil schedule of electrogalvanizing line is 8, 1,2,3,4,5,6,7;

Step 5: Displaying the obtained coil schedule at display module interface.

Step 6: Sending the coil schedule to the automatic control system of the production line through network to guide production in real time.

The coil scheduling system for electrogalvanizing line in steel industry comprises at least one PC, at least one cable interface, optical cable interface or special telephone line interface, and at least one router.

Figure 6:
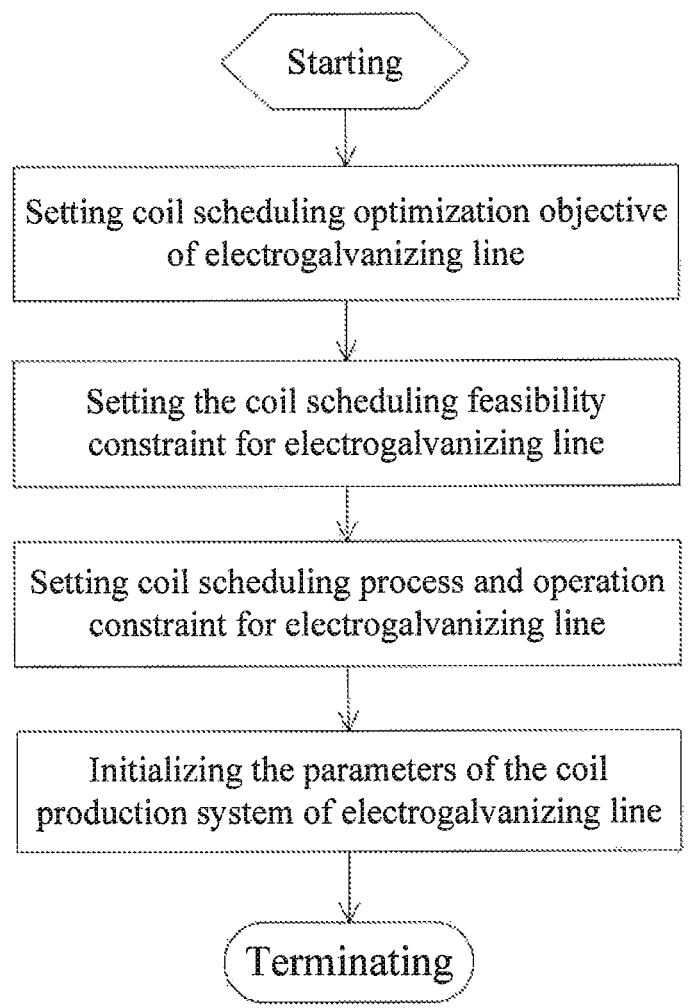
FIG. 6 is the operation flow diagram of the production environment setting module of the coil scheduling system for electrogalvanizing line in steel industry of the present invention.
Figure 7:
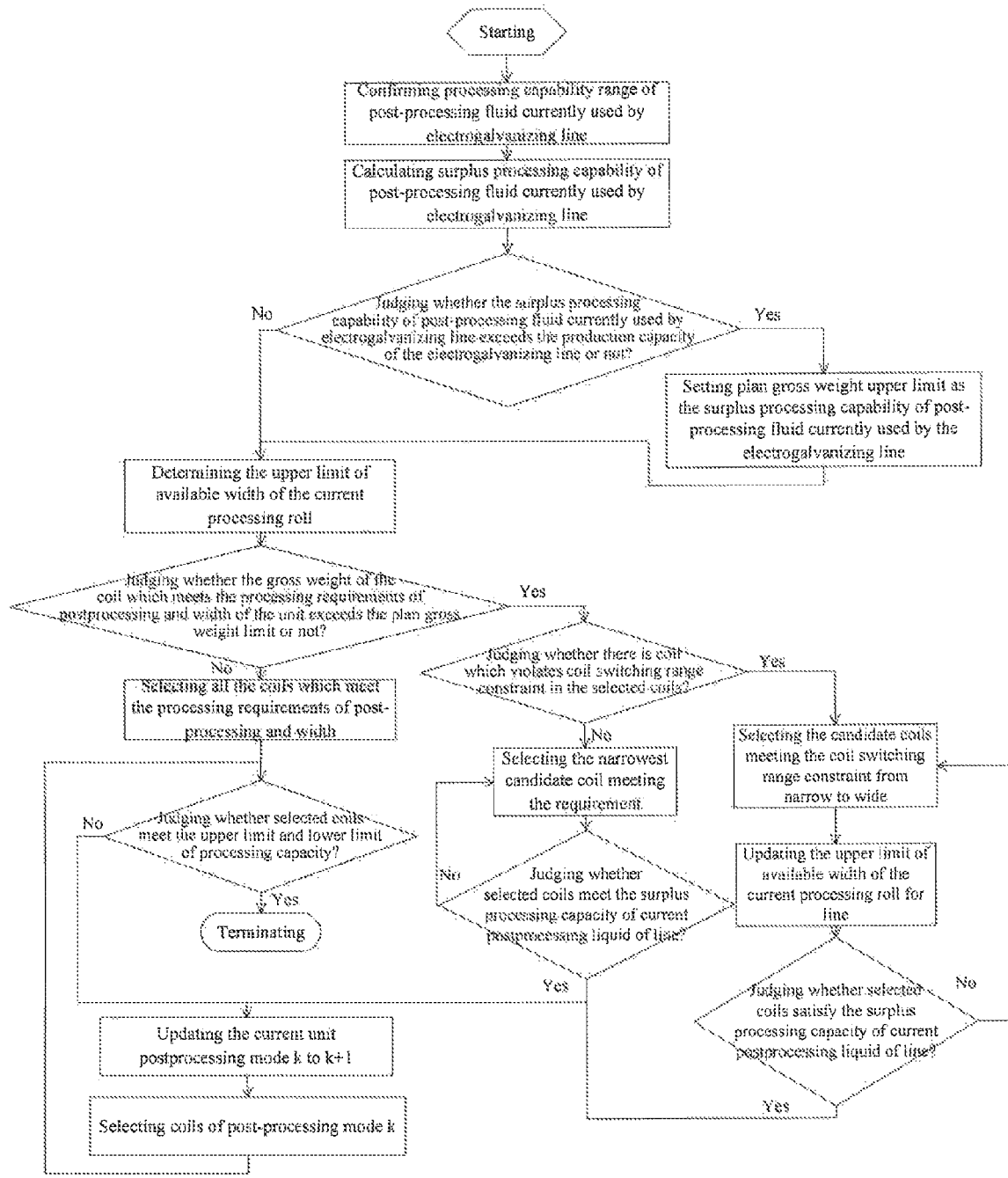
FIG. 7 is the operation flow diagram of the coil selection module of the coil scheduling system for electrogalvanizing line in steel industry of the present invention.
Figure 8:
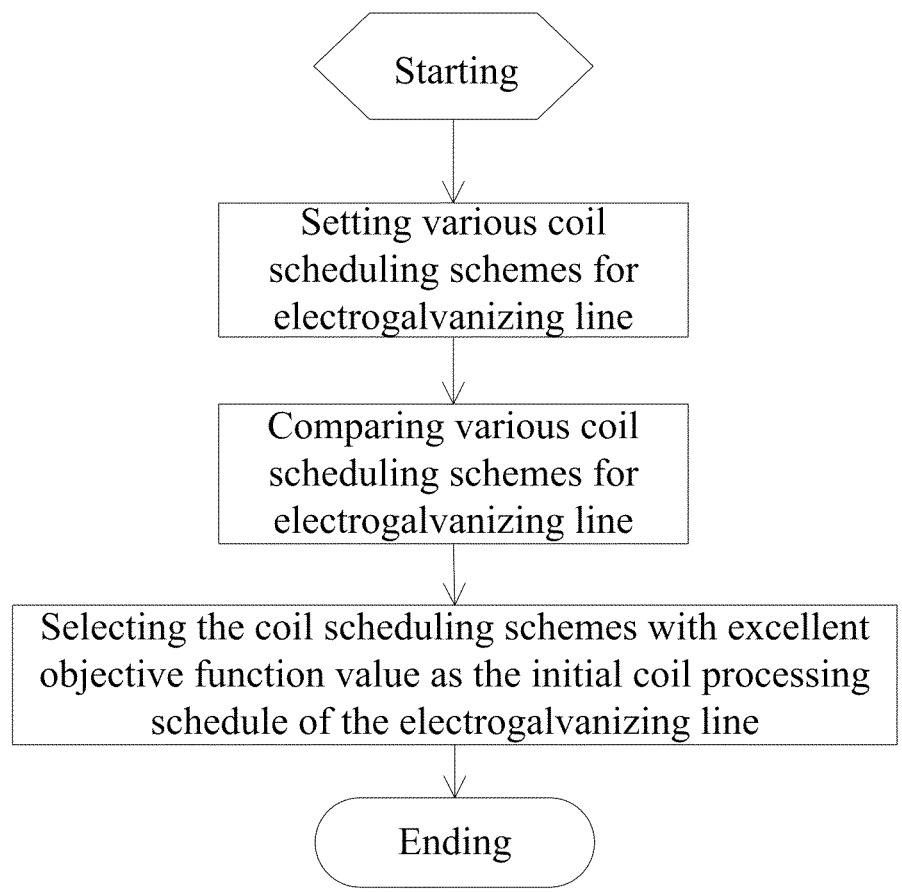
FIG. 8 is the operation flow diagram of the coil scheduling module of the coil scheduling system for electrogalvanizing line in steel industry of the present invention.
Figure 9:
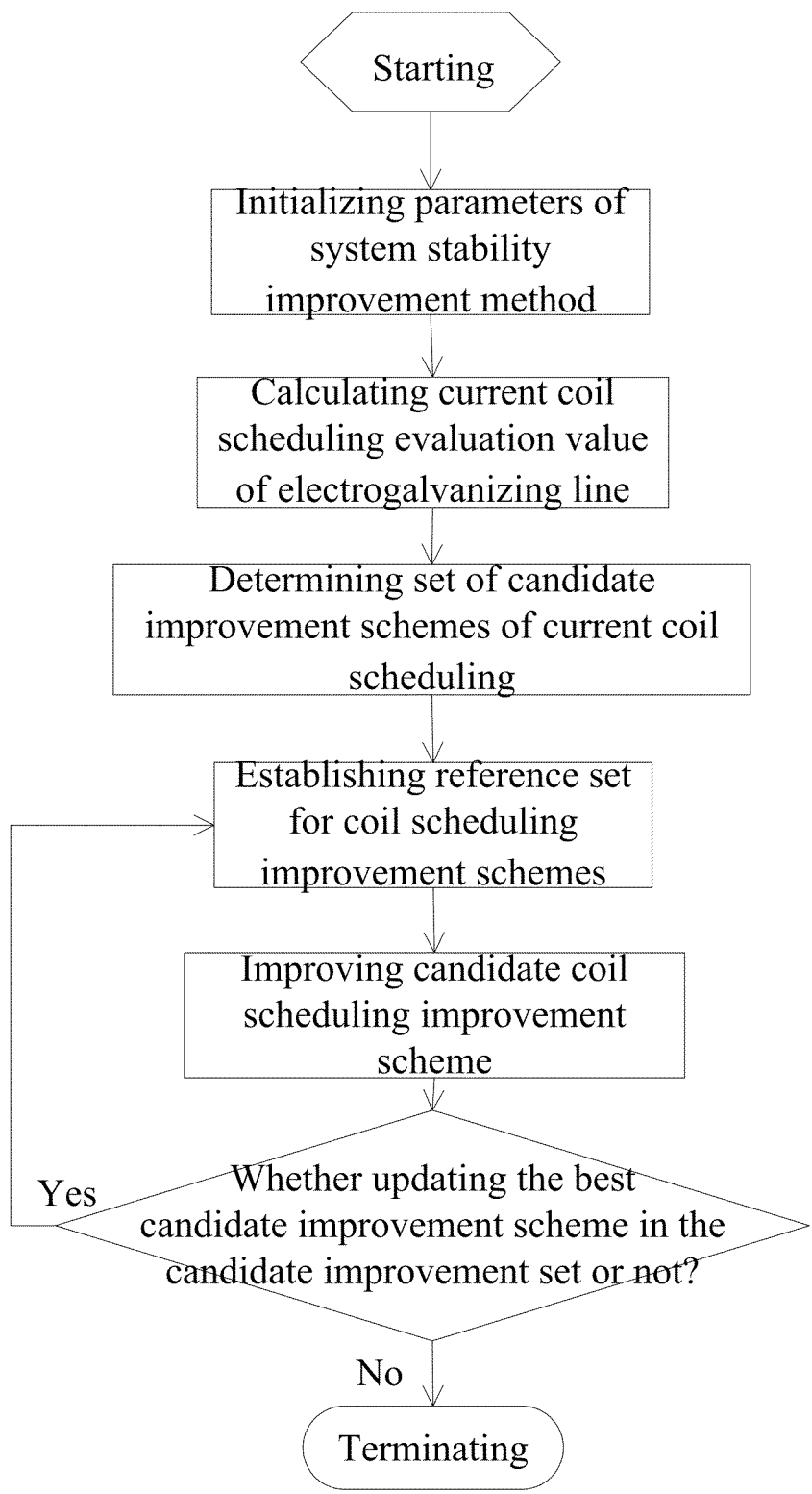
FIG. 9 is the operation flow diagram of the coil scheduling real-time improvement module of the coil scheduling system for electrogalvanizing line in steel industry of the present invention.
Figure 10:
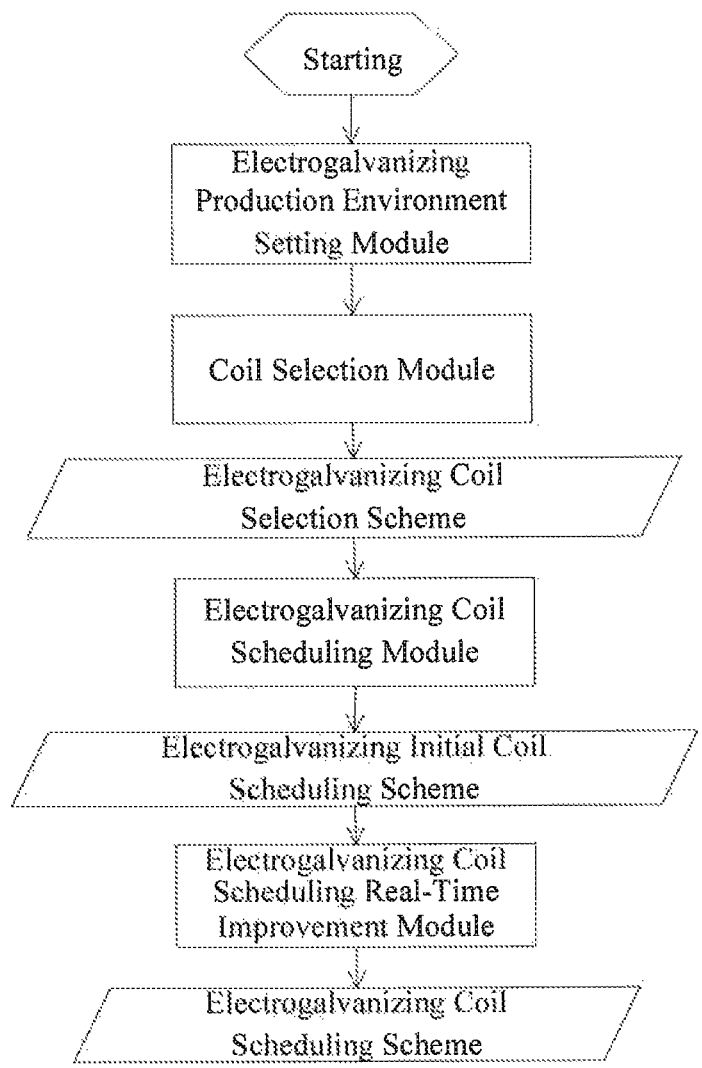
FIG. 10 is the structural relation diagram of all the functional modules in the coil scheduling system for electrogalvanizing line in steel industry of the present invention.

The PC comprises software of coil scheduling system for electrogalvanizing line in steel industry, and the software comprises a production environment setting module, a coil selection module, a coil scheduling module, and a coil scheduling real-time improvement module; where the production environment setting module is used for setting the processing parameter of the coil production environment of the electrogalvanizing line, describing a technological process, and determining the improvement objectives and the constraints of the technological process; FIG. 6 shows the main flow;

The coil selection module selects coils based on the current processing state of the electrogalvanizing line; FIG. 7 shows the main flow;

The coil scheduling module schedules the selected coils based on the current coil selection, obtains various coil processing schedules, and selects better coil schedule as the current processing scheme;

FIG. 8 shows the main flow;

The coil scheduling real-time improvement module improves the current coil processing schedule in real time on line, and improves and obtains better coil processing scheme; FIG. 9 shows the main flow;

When performing coil scheduling task, all the functional modules of the system are cooperated;

FIG. 10 shows the operation relation of the functional modules.

The PC is connected to the terminal of an enterprise automatic control system of the electrogalvanizing line through a network and an internal server.

What is claimed is:

1. A coil scheduling method for electrogalvanizing line in steel industry, comprising:

Step 1: describing a technological process and determining constraints of the technological process;

Step 2: selecting coils according to a current state of an electrogalvanizing line; the selecting step comprising: selecting the coils of the electrogalvanizing line to be processed according to a current line state and an inventory and production conditions of preceding lines: firstly, judging postprocessing liquid k adopted by the current line; computing the total weight $W_k^P$ of the coils that have been processed by using the postprocessing liquid k; determining a current processing capacity of the postprocessing liquid according to a rated processing range of the postprocessing liquid$[L_k^P, U_k^P]$ set by a system: $Q=U_k^P-W_k^P$;

if $U_k^P-W_k^P \leq U$, the selection steps of the coils are as follows:

Step 2A-1: judging the current processing state of the line; finding a width of a last coil in a production schedule before a current formulated production schedule, that is an upper limit of an available processing width $W^A$ of a current roller;

Step 2A-2: determining a total weight of available coils in a current production period according to a preceding inventory of the electrogalvanizing line and a processing condition of a preceding production line; classifying the coils in a required postprocessing mode; computing a total tonnage $W_k$ of the available coils which should be processed by using the postprocessing liquid k and have the width of not greater than $W^A$; judging as follows:

if $W_k \leq Q$, all the coils, which should be processed in the required postprocessing liquid k and have the width of not greater than $W^A$, are selected; recording all related coil numbers;

if $W_k > Q$, selecting from the coils which should he processed in the required postprocessing liquid k and have the width of not greater than $W^A$, the selecting step comprising:

Step 2A-2-1: if there is no coil whose width is greater than or equal to $W^A+L^W$ in a coil set, selecting coils from narrow to wide until newly added coils cause a current total weight of the selected coils to exceed $U_k^P-W_k^P$;

Step 2A-2-2: if there are coils whose widths are greater than or equal to $W^A+L^W$ in the coil set, computing a total tonnage W' of the coils whose widths are not less than $W^A+L^W$; if $W' \geq U_k^P-W_k^P$, selecting coils whose width is not less than $W^A+L^W$ from wide to narrow until the total weight of the selected coils exceeds $U_k^P-W_k^P$; otherwise, selecting all the coils whose widths are not less than $W^A+L^W$ and selecting coils whose width is less than $W^A+L^W$ from narrow to wide until the total weight of the current selected coils exceeds $U_k^P-W_k^P$;

Step 2A-2-3: if the total weight of the selected coils does not meet a lower bound of the total weight of the selected coils, selecting coils required to be processed in the other postprocessing liquid; selecting coils according to an ascending order of postprocessing codes, i.e., firstly selecting the coils in a postprocessing mode g=k+1; updating an upper weight limit of the selected coils as $U'=U-(U_k^P-W_k^P)$:

(1) if the total weight of available coils required to be processed by using a postprocessing liquid g meets $W_g \geq U'$, selecting coils required to be processed by using the postprocessing liquid g from narrow to wide until the total weight of selected coils exceeds U;

(2) if the total weight of available coils required to he processed by using the postprocessing liquid g meets Wg<U', selecting all the coils required to be processed by using the postprocessing liquid g, updating k=k+1, and going to step 2A-2-3;

wherein, updating k as the smallest postprocessing code if a current postprocessing code k in the step 2A-2-3(2) is the largest postprocessing code; the current postprocessing code g of selecting means the postprocessing code that the selected coils correspond to;

If $U_k^P-W_k^P>U$, the selection steps of the coils are as follows:

Step 2B-1: judging the current processing state of the line; finding the width of the last coil in the schedule before the current formulated schedule, that is the upper limit of the available processing width $W^A$ of the current roller;

Step 2B-2: determining the total weight of available coils in the current production period according to the preceding inventory of the electrogalvanizing line and the processing state of a preceding production line; classifying the coils in a required postprocessing mode; computing the total tonnage $W_k$ of the available coils which are required to be processed by using the postprocessing liquid k and have the width of not greater than $W^A$; judging as follows:

if $W_k \leq U$, all the coils, which are required to be processed by using the postprocessing liquid k and have the width of not greater than $W^A$, are selected; recording all related coil numbers;

if $W_k > U$, selecting from the coils which are required to be processed by using the postprocessing liquid k and have the width of not greater than $W^A$:

Step 2B-2-1: if there is no coil whose width is greater than or equal to $W^A + L^W$ in the coil set, selecting coils from narrow to wide until the selected coils result in that the total weight of the selected coils exceeds U;

Step 2B-2-2: if there are coils whose widths are greater than or equal to $W^A + L^W$ in the coil set, computing the total tonnage W' of the coils whose widths are not less than $W^A + L^W$; if $W' \geq U$, selecting coils whose width is not less than $W^A + L^W$ from wide to narrow until the selected coils result in that the total weight of the selected coils exceeds U; otherwise, selecting all the coils whose widths are not less than $W^A + L^W$ and selecting coils whose width is less than $W^A + L^W$ from narrow to wide until the total weight of the selected coils exceeds U;

Step 2B-2-3: if the total weight of the selected coils does not meet the lower bound of the total weight of the selected coils, selecting coils in the other postprocessing mode; selecting coils according to the ascending order of the postprocessing codes, i.e., firstly selecting the coils in the postprocessing mode g=k+1; updating the upper weight limit of the total weight of the selected coils as $U'=U-W_k$:

(1) if the total weight of available coils required to be processed by using the postprocessing liquid g meets $W_g \geq U'$, selecting coils in the postprocessing mode g from narrow to wide until the total weight of the selected coils exceeds U;

(2) if the total weight of available coils required to be processed by using the postprocessing liquid g meets $W_g < U'$, selecting all the coils in the postprocessing mode g, updating k=k+1, and going to step 2B-2-3;

Step 3: setting an initial processing schedule of the selected coils of the electrogalvanizing line; classifying the selected coils, then the coils with same postprocessing code form a cluster; for any coil cluster, scheduling the coils from thick to thin or from thin to thick in order to minimize the total changeover costs of a coil schedule in the cluster; for two adjacent clusters, if the coils in a preceding cluster are scheduled from thin to thick or from thick to thin, the coils in a next cluster are scheduled from thick to thin or from thin to thick; in this way, the thickest or thinnest coil in the next cluster is processed after the thickest or thinnest coil in the preceding cluster; the method is as follows:

Step 3-1: initializing the current postprocessing code k as a minimum postprocessing code in the selected coils;

Step 3-2: if all the coils in the postprocessing mode are scheduled, obtaining an original processing schedule of the coils and outputting a result; otherwise, going to step 3-3;

Step 3-3: scheduling coils required to be processed by using the postprocessing liquid k from wide to narrow; classifying the coils required to be processed by using the postprocessing liquid according to their widths, thus g coil sets $\Omega_{k1}, \Omega_{k2}, \ldots, \Omega_{kg}$ are formed;

Step 3-4: scheduling the coils in the coil sets $\Omega_{k1}, \Omega_{k2}, \ldots \Omega_{kg}$, respectively, to form a first and a second coil schedules, wherein the first schedule comprising: scheduling the coils in the coil set $\Omega_{kg}$ with odd labels from thick to thin; scheduling the coils in the coil set $\Omega_{kg}$ with even labels from thin to thick; the second schedule comprising the steps: scheduling the coils in the coil set $\Omega_{kg}$ with odd labels from thin to thick; scheduling the coils in the coil set $\Omega_{kg}$ with even labels from thick to thin; comparing the first and second schedules; setting the coil schedule with the minimum total stability defects as the initial coil schedule $S^I$ of the selected coils of the electrogalvanizing line;

Step 4: improving the coil schedule of the electrogalvanizing line in time; the improving method comprises the following steps:

Step 4-1: initializing the parameters of the improving method of a system stability; setting a current processing schedule $S^B$ of the coils of the electrogalvanizing line as $S^I$; obtaining a current selected coil set CS and a current available coil set CA, wherein CS is a coil set for all the coils selected in the current processing schedule of the electrogalvanizing line; CA is a coil set of all the coils which are in inventory or can be sent to the electrogalvanizing line in time based on the processing state of the preceding line but not selected in the current coil processing schedule of the electrogalvanizing line; |CS| is the number of the coils in the current selected coil set CS; |CA| is the number of the coils in the current available coil set CA; obtaining the coil processing schedules $m_1, m_2, \ldots, m_{|CS|}$ corresponding to the current coil processing schedule $S^B$ of the electrogalvanizing line, wherein $m_i$ is a coil which is the $l^{th}$ processed coil in the current coil processing schedule of the electrogalvanizing line; setting a stability estimation value as the formula:

$$f(\overline{S}) = \lambda_1 \times \sum_{i=1}^{n} \sum_{j=1}^{n} (c_{ij}^P + c_{ij}^W + c_{ij}^T) x_{ij}^S + \lambda_2 \times \sum_{i=1}^{n} p_i y_i^S \quad (15)$$

in the formula, the stability estimation value is a system stability penalty of the coil processing schedule S, the smaller the penalty is, the stabler and more practicable the coil schedule is, Step 4-2: computing the stability estimation value $f(S^B)$ of the current coil processing schedule of the electrogalvanizing line;

Step 4-3: determining a candidate improvement set P of the current coil processing schedule $S^B$ of the electrogalvanizing line; obtaining the improving method of the coil processing schedule, as follows:

(1) inserting the coils: on a premise of not violating the production capacity constraints and postprocessing batching constraints, obtaining a candidate improved coil processing schedule by inserting new coils h in the current coil processing schedule; the positions of the new coils h in the coil processing schedule shall meet the processing constraints (1) to (11) set by the system;
(2) deleting the coils: on the premise of not violating the production capacity constraints and postprocessing batching constraints, obtaining a candidate improved coil processing schedule with lower stability estimation value by deleting the coil $m_i$, (i=1, 2, ..., |CS|) from the current coil processing schedule while ensuring that the width and thickness switching range of coil $m_{i-1}$ and coil $m_{i+1}$ does not violate the constraints (10), (11) after deleting the coil $m_i$;
(3) adjusting coil selection schemes: on the premise of not violating the production capacity constraints, postprocessing batching constraints and the processing constraints (2) to (11) set by the system, obtaining a candidate improved coil processing schedule with lower stability estimation value by exchanging the coils in the coil CS in the current coil processing schedule and the coils in the current available coil set CA;
(4) adjusting the coil processing schedule: On the premise of not violating the production capacity constraints and postprocessing batching constraints, obtaining a. candidate improved coil processing schedule with lower stability estimation value by adjusting the positions of the coils in the current coil processing schedule through the exchange neighborhood and the 2-opt neighborhood of the current coil processing schedule;
wherein, the exchange neighborhood of the current coil processing schedule refers to: a set of all the possible coil schedules obtained by exchanging the positions of any two coils in the coil processing schedule of the electrogalvanizing line on the premise of not violating the processing constraints (2) to (11) set by the system;
2-opt neighborhood refers to: a set of all the possible coil schedules obtained by exchanging any two coil adjacent relations in the coil processing schedule of the electrogalvanizing line on the premise of not violating the processing constraints (2) to (11) set by the system;
Step 4-4: establishing a reference set of improvement schemes of the coil processing schedule; adding the previous b1 candidate improvement schemes with better stability estimation values in the current candidate improvement set P into the reference set, i.e. RefSet={$x_1, \ldots, x_{b1}$}; removing the $b_1$ candidate improvement schemes from the candidate improvement set P; computing the minimum distance between each candidate improvement scheme in the current candidate improvement set P and the current coil scheduling scheme in the reference set; adding the candidate improvement scheme of the coil processing schedule with the largest minimum distance from the reference set into the reference set RefSet; removing it from the candidate improvement set P; repeating the process $b_2$ times; then, the current reference set RefSet={$x^1, \ldots, x^b$}, $b=b_2+b_2$;
Step 4-5: generating b(b-1) new coil improvement schemes based on any pair of coil processing schedules in the reference set RefSet by using the combined method of the coil scheduling schemes; improving the new improvement schemes; obtaining candidate coil scheduling improvement schemes with better stability by using steps 4-3(1) to 4-3(4);
the combined method of the coil scheduling schemes comprises the steps: firstly, contrasting the coil selection of two coil processing schedules; obtaining a set comprised by the coils selected by the two coil scheduling schemes; secondly, determining the processing positions of the coils in the set comprised by the coils selected by the two coil scheduling schemes; if adjacent coils both belong to set comprised by the coils selected by the two coil scheduling schemes, the adjacent relation in the coil processing schedules with better system stability is adopted; if adjacent coils do not belong to the set comprised by the coils selected by the two coil scheduling schemes, trying to insert the coils into primal positions; obtaining the coil processing schedule with better evaluation;
Step 4-6: updating the candidate improvement set P; replacing solutions with poor stability in the candidate improvement set P by the new candidate coil scheduling improvement schemes with better stability;
Step 4-7: if the time that the best candidate improvement scheme in the candidate improvement set P is not improved reaches the upper limit of non-improvement iterations, stopping selecting the candidate improvement scheme with the best evaluation value in the candidate improvement set P as the current improvement scheme; otherwise, going to the step 4-4.

2. The coil scheduling method for electrogalvanizing line in steel industry of claim 1, wherein step 1 of the technical process is described by establishing a coil production model of the electrogalvanizing line, comprising:
Step 1-1: the objective function of the coil production model of the electrogalvanizing line is:

$$\text{minimize } \lambda_1 \times \sum_{i=1}^{n} \sum_{j=1}^{n} (c_{ij}^P + c_{ij}^W + c_{ij}^T)x_{ij} + \lambda_2 \times \sum_{i=1}^{n} p_i y_i \quad (1)$$

in the formula, $\lambda_1$ represents the weight of the effect of the production switching (i.e. postprocessing (each postprocessing mode corresponds to a distinct postprocessing code and a distinct postprocessing liquid), width and thickness) on the stability of the production system; $\lambda_2$ represents the weight of the effect of selection of the coils on the stability of the production system; $c_{ij}^P$ represents system stability defect penalty caused by changing the postprocessing liquid if coil j is processed immediately after coil i; $c_{ij}^W$ represents system stability defect penalty caused by width changeover if coil j is processed immediately after coil i; $c_{ij}^T$ represents system stability defect penalty caused by thickness changeover if coil j is processed immediately after coil i; $p_i$ represents system stability influence penalty of processing the selected coil i by the current coil selection schedule; decision variable $x_{ij}$ represents the adjacent relation between the coil i and the coil j in the continuous electrogalvanizing processing schedule; when the coil i is processed immediately before the coil j, $x_{ij}$ is 1; otherwise, $x_{ij}$ is 0; decision variable $y_i$ represents whether the coil i is selected to be processed in the continuous electrogalvanizing processing schedule; when the coil i is selected to be processed, $y_i$ is 1; otherwise, $y_i$ is 0; the number of available coils to be processed is n;
Step 1-2: initializing the parameters of the production system of the electrogalvanizing line based on the upper limit and the lower limit of the processing capacity of the electrogalvanizing line within the coil processing plan, the upper limit and the lower limit of the processing capacity of a postprocessing liquid, the width changeover range and the thickness changeover range, the coils in preceding inventory, the coils that are estimated to be arrived in electrogalvanizing line in time and are being processed in the preceding production line now, and the current processing state of the electrogalvanizing, line; the formula is as follows:

setting system stability defect penalty $c_{ij}^P$ caused by changing the postprocessing liquid if coil j is processed immediately after coil i, as follows:

$$c_{ij}^P = \begin{cases} \lambda_{p_j^{-1}}^P, & \text{if the postprocessing liquid required by the coil } i \text{ and the coil } j \text{ are different} \\ 0, & \text{otherwise} \end{cases} \quad (12)$$

wherein, $\lambda_{p_j^{-1}}^P$ represents system stability defect penalty incurred by the initialization of the postprocessing liquid corresponding to the postprocessing code $p_j^{-1}$;

setting system stability defect penalty caused by width changeover if coil j is processed immediately after coil i; the formula is as follows:

$$c_{ij}^w = \begin{cases} \alpha_1^w \cdot (w_i - w_j), & \text{If } 0 \le w_i - w_j \le w_1^L \text{ and } t_i < t^L \\ \alpha_2^w \cdot (w_i - w_j), & \text{If } 0 \le w_i - w_j \le w_2^L \text{ and } t_i \ge t^L \\ \infty, & \text{If } w_i - w_j < 0 \\ \alpha_3^w \cdot (w_i - w_j), & \text{otherwise} \end{cases} \quad (13)$$

wherein, $\alpha_1^w$ represents the penalty of the unit width changeover under the condition that the thickness of the preceding processed coil is less than $t^L$ and the width changeover is not more than $w_1^L$; $\alpha_2^w$ represents the penalty of the unit width changeover under the condition that the thickness of the preceding processed coil is not less than $t^L$ and the width changeover is not more than $w_2^L$; $\alpha_3^w$ represents the penalty of the unit width changeover not satisfying the condition that the thickness of the preceding processed coil is less than $t^L$ and the width changeover is not more than $w_1^L$ or the thickness of the preceding processed coil is not less than $t^L$ and the width changeover is not more than $w_2^L$ when processing from wide to narrow; $t^L$ represents a thickness boundary value during calculating system stability defect penalty caused by thickness changeover; $w_1^L$ and $w_2^L$ represent width boundary values during calculating system stability defect penalty caused by width changeover; setting system stability defect penalty caused by thickness changeover if coil j is processed immediately after coil i; the formula is as follows:

$$c_{ij}^t = \alpha^t \cdot \frac{\max\{t_i, t_j\}}{\min\{t_i, t_j\}} - \alpha^t \quad (14)$$

wherein, $\alpha^t$ represents the unit system stability defect penalty incurred by the thickness changeover;

setting the system stability influence penalty $p_i$ incurred by processing the selected coil i in the current coil schedule.

3. The coil scheduling method for electrogalvanizing line in steel industry of claim 2, wherein the constraints of the coil production model of the electrogalvanizing line of step 1-1 comprises constraints to keep feasibility and operation constraints in electro-galvanizing line:

1) the formula of the constraints to keep feasibility is:

$$\sum_{j \in N\setminus\{i\}} x_{ij} = y_i \quad (2)$$

$$\forall i \in N$$

$$\sum_{i \in N\setminus\{j\}} x_{ij} = y_j \quad (3)$$

$$\forall j \in N$$

$$\sum_{i,j \in S} x_{ij} \le |S| - 1 \quad (4)$$

$$\forall S \subseteq \{1, 2, \ldots, n-1, n\}, \quad 2 \le |S| \le n$$

$$x_{ij}, y_i \in \{0, 1\} \quad (5)$$

$$\forall i = 1, 2, \ldots, n-1, n, \quad j = 1, 2, \ldots, n-1, n$$

wherein, N indicates a set of available coils in the preceding inventory; formulas (2) and (3) provide a relationship between decision variables $x_{ij}$ and $y_i$; formula (4) are used for preventing the coils from being preempted in the working process; formula (5) are the range of decision variables $x_{ij}$ and $y_i$;

in addition to having the above system constraints to keep feasibility according to formulas (2) to (5), the electrogalvanizing line has operation constraints- in electrogalvanizing line during processing the coils:

2) the formula of the constraints for ensuring that the formulated coil processing schedule satisfies the upper limit and the lower limit of the total weight of the processed coils is as follows:

$$L \le \sum_{i \in N} wt_i y_i \le U \quad (6)$$

$$\forall i \in N$$

wherein, L indicates the lower limit of the total weight of the processed coils in a single production plan of the electrogalvanizing line; U indicates the upper limit of the total weight of the processed coils in a single production plan of the electrogalvanizing line; $wt_i$ indicates the weight of the coil i of the electrogalvanizing line;

3) the postprocessing batching constraints comprise constraints for determining the total weight of the coils in the same postprocessing liquid after processing any coil in the coil processing schedule with the same postprocessing requirement: the formula is as follows:

$$W_j = (1 - z_j) \times \left( W_i + \sum_{j \in N} wt_j x_{ij} \right) \quad (7)$$

$$\forall j \in N$$

and constraints for guaranteeing that the total weight of the coils in the same postprocessing liquid satisfies the upper limit and the lower limit of the total weight of the coils in the same postprocessing liquid, the formula is as follows:

$$L_{p_j^{-1}}^P z_j \le W_j \le U_{p_j^{-1}}^P z_j \, \forall i \in N \quad (8)$$

wherein, $L_{p_j^{-1}}^P$ indicates the lower limit of the total weight of the continuous processed coils with the postprocessing code of $p_j^{-1}$; $p_j^{-1}$ indicates the postprocessing code of the coil j; $W_j$ indicates the total weight of the processed coils in the same postprocessing liquid after processing the coil j; $U_{p_j^{-1}}^P$ indicates the upper limit of the total weight of the continuous processed coils with the postprocessing code of $p_j^{-1}$; $z_j$ indicates a decision variable; when the postprocessing code of the coil j and the postprocessing code of the coil processed immediately before the coil j are identical, it is 0; otherwise, it is 1;

4) the formula of the constraints of the width switching trend for ensuring that the coils in the same postprocessing liquid are processed from wide to narrow is as follows:

$$(w_i - w_j) \times x_{ij} \geq 0 \forall i \in N, j \in N, p_i^{-1} = p_j^{-1} \qquad (9)$$

wherein, $w_j$ represents the width of the coil j;

5) the formula of the constraints of the width changeover range for ensuring that the changeover of the exit width between two adjacent coils in the electrogalvanizing processing plan does not exceed the allowed range is as follows:

$$L^W \leq (w_i - w_j) \times x_{ij} \leq U^W \forall i \in N, j \in N \qquad (10)$$

wherein, $L^W$ is the lower limit of the width changeover range in the coil processing schedule of the electrogalvanizing line; $U^W$ is the upper limit of the width changeover range in the coil processing schedule of the electrogalvanizing line;

6) the formula of the constraints of the thickness changeover range for ensuring that the changeover of the exit thickness between two adjacent coils in the electrogalvanizing processing plan does not exceed the allowed range is as follows:

$$L^T \leq (t_i - t_j) \times x_{ij} \leq U^T \forall i \in N, j \in N, \qquad (11)$$

wherein, $L^T$ represents the lower limit of the thickness changeover range in the coil processing schedule of the electrogalvanizing line; $U^T$ represents the upper limit of the thickness changeover range in the coil processing schedule of the electrogalvanizing line; $t_i$ represents the thickness of the coil i; $t_j$ represents the thickness of the coil j.

4. A system using the coil scheduling method for electrogalvanizing line in steel industry of claim 1, comprising:
   at least one personal computer (PC), wherein the system performs the method of claim 1;
   at least one cable interface or fiber optic cable interface or special telephone line interface; and
   at least one router,
   wherein the PC comprises a non-transitory memory containing a software of the system for scheduling the coils of the electrogalvanizing line; the software comprises a production environment setting module; a coil selection module; a coil scheduling module and a coil scheduling real-time improvement module, wherein the production environment setting module is used for setting the processing parameters of the production environment of the electrogalvanizing line, describing a technological process, and determining the improvement objectives and the constraints of the technological process; the coil selection module is used for selecting the coils and determining the coil selection scheme according to the current processing state of the electrogalvanizing line; the coil scheduling module is used for scheduling the selected coils based on the current coil selection condition, obtaining various processing schedules of the coils and selecting a better coil schedule as the current processing scheme; the coil scheduling real-time improvement module is used for conducting online real-time improvement on the current coil processing scheme, improving the processing scheme and obtaining better coil processing schedules; the PC is connected to the terminal of an enterprise automatic control system of the electrogalvanizing line through a network and an internal server.

* * * * *